(12) United States Patent
Vinsonneau

(10) Patent No.: US 7,043,482 B1
(45) Date of Patent: May 9, 2006

(54) AUTOMATIC AND SECURE DATA SEARCH METHOD USING A DATA TRANSMISSION NETWORK

(76) Inventor: Daniel Vinsonneau, 3, Rue du Moulin, 06110 Le Cannet (FR)

( * ) Notice: Subject to any disclaimer, the term of this patent is extended or adjusted under 35 U.S.C. 154(b) by 0 days.

(21) Appl. No.: 10/450,145

(22) PCT Filed: May 23, 2000

(86) PCT No.: PCT/FR00/01407

§ 371 (c)(1),
(2), (4) Date: Oct. 14, 2003

(87) PCT Pub. No.: WO01/90934

PCT Pub. Date: Nov. 29, 2001

(51) Int. Cl.
*G06F 17/30* (2006.01)

(52) U.S. Cl. .............. 707/10; 707/3; 707/4; 707/5; 707/104.1; 707/709; 707/200; 707/201; 707/217; 707/218

(58) Field of Classification Search .................. 707/1, 707/2, 3, 4, 5, 10, 104.1; 704/270.1; 709/217, 709/216
See application file for complete search history.

(56) References Cited

U.S. PATENT DOCUMENTS

| | | | | |
|---|---|---|---|---|
| 5,278,980 A | * | 1/1994 | Pedersen et al. | 707/4 |
| 5,500,920 A | * | 3/1996 | Kupiec | 704/270.1 |
| 5,576,954 A | * | 11/1996 | Driscoll | 707/3 |
| 5,577,241 A | * | 11/1996 | Spencer | 707/5 |
| 5,640,553 A | * | 6/1997 | Schultz | 707/5 |
| 5,642,502 A | * | 6/1997 | Driscoll | 707/5 |
| 5,696,962 A | * | 12/1997 | Kupiec | 707/4 |
| 5,842,212 A | * | 11/1998 | Ballurio et al. | 707/100 |
| 5,913,214 A | | 6/1999 | Madnick et al. | 707/10 |
| 5,987,446 A | * | 11/1999 | Corey et al. | 707/3 |
| 6,070,158 A | * | 5/2000 | Kirsch et al. | 707/3 |
| 6,078,914 A | * | 6/2000 | Redfern | 707/3 |
| 6,275,820 B1 | * | 8/2001 | Navin-Chandra et al. | 707/3 |
| 6,466,940 B1 | * | 10/2002 | Mills | 707/102 |
| 6,539,373 B1 | * | 3/2003 | Guha | 707/3 |
| 2004/0015476 A1 | * | 1/2004 | Twaddle | 707/1 |

FOREIGN PATENT DOCUMENTS

| | | |
|---|---|---|
| EP | 0 940 762 | 9/1999 |
| WO | WO 00/14651 | 3/2000 |

OTHER PUBLICATIONS

Baldazo, "Navigating with a Web Compass," 21 *BYTE* 97 (Mar. 1996).
Bayardo et al., "InfoSleuth: Agent-Based Semantic Integration of Information in Open and Dynamic Environments," 26 *Sigmund Research* 195 (1997).

* cited by examiner

*Primary Examiner*—Frantz Coby
(74) *Attorney, Agent, or Firm*—James C. Lydon

(57) ABSTRACT

A method for searching data stored in at least one database (32, 34) accessible from an external server of a data transmission network (14), including sending a query (36) for every database from a local server associated with at least one local database (12), the query including fields containing general criteria relating to the type of information, the content of the information, and/or dates associated with the information, with the ability to link the fields by Boolean operators. The download step includes: generation of scripts by the local server including a series of commands based on the general criteria and enabling creation of pointers to identify the data fields to be downloaded, and activating robots to download the fields indicated by the pointers and other data fields associated by predefined relationships with the indicated data fields.

18 Claims, 5 Drawing Sheets

| | |
|---|---|
| PATENT NUMBER | INTER CLASSIFICATION |
| TITLE | ECLA CLASSIFICATION |
| INVENTOR | PRIORITY COUNTRY |
| APPLICANT | PRIORITY NUMBER |
| ISSUE DATE | PRIORITY DATE |
| PUBLICATION DATE | FAMILY |
| ABSTRACT | FILING DATE |
| CLAIMS | FILING NUMBER |
| DESCRIPTION | PATENT ATTORNEY |
| US CLASSIFICATION | FIRST EXAMINER |
| CITED PATENTS | |

FIG. 5

AUTOMATIC AND SECURE DATA SEARCH METHOD USING A DATA TRANSMISSION NETWORK

This application is a U.S. National Stage of International Application PCT/FR00/01407, filed May 23, 2000 and published on Nov. 29, 2001 in the French Language.

TECHNICAL FIELD

This invention concerns document retrieval methods and systems wherein a user can access, by means of a local server of a data transmission network, to data banks accessible through network servers. The data that meets the criteria defined by the user can then be downloaded and stored in a database associated with the local server.

BACKGROUND ART

There are a large number of data banks that offer access to the most diverse information such as patents, stock prices, air ticket reservations, etc. These data banks are usually accessible via the Internet or through a direct connection using the telephone network. It is therefore possible to query a data bank either by entering the querys from the keyboard or by using a file containing at least one query called an automatic query script. The retrieved data can either be displayed interactively, or printed, or even saved in a file for subsequent consultation.

A type of data bank that is commonly used includes databases containing the publication of patents that currently constitute 80% of written information that exists in the world. The patent databases can be classified into two families: non-specialized databases that are created using a documentary background wherein information is grouped together by family. These types of databases help limit the number of articles while favoring reading of data in a specific language. This is the case with the ESPACENET database of the European Patents Office where bibliographical information is translated into English. National databases, on the other hand, are limited to the patents of a given country (France, Germany) but are more complete considering that the information provided is the entire patent, for example. The search therefore consists in making an initial query on the non-specialized database of the ESPACENET type to select the publication numbers, and then make a second query on one or more national databases to obtain more complete information.

Although in patent databases, several downloads concerning the same subject may be grouped together by deleting duplicates and possibly deleting patents that are not pertinent, every query made on the WEB via the Internet is independent. The HTML pages obtained are also independent. As a result, the user does not have any overall information.

The current method of querying the data banks and, in particular, the databases relating to patents, does not therefore present any significant efficiency at the industrial level. Actually, data obtained from a search on the Internet takes time to be downloaded, is difficult to consult and handle and is also incorrect at times. These disadvantages result from the fact that every query is a manual query and is restricted to a single query process, which multiplies the number of these manual queries.

Finally, a major disadvantage of the methods for searching data on the Internet is their lack of confidentiality. Actually, an information server has a Log file that displays the contents of queries in progress. The IP address of the server used is also known. As a result, a malicious person can, by viewing a query, be aware of the subject, which the person querying the server is working on.

SUMMARY OF THE INVENTION

The purpose of the invention is therefore to provide an automated method for searching data in databases accessible via a data transmission network that provides rapid and efficient access to several databases without having to formulate multiple manual queries.

Another purpose of the invention is to provide a secure method for searching data in databases accessible via a data transmission network in which the original query is a query of a general nature that does not reveal specific information on the characteristics of the search.

In accordance with a first object, the invention therefore concerns a method for searching data stored in at least one database accessible from at least one external server of a data transmission network consisting in sending a query for every database from a local server associated with at least one local database, the query including the fields containing general criteria relating to the type of information searched for, the content of the information, and/or the dates associated with the information, with the ability to link the various fields using Boolean operators. The download step includes the following steps: generation of scripts by the local server consisting of a series of commands based on the general criteria and enabling the creation of pointers to identify the data fields to be downloaded, and activating robots to download the fields indicated by the pointers as well as other data fields associated by predefined relationships with the indicated data fields.

According to a second object, after the data that meets the general criteria has been downloaded from the external server to the local server, a syntax analysis of the downloaded data based on specific criteria different from the general criteria is carried out enabling the creation of pointers to specific data fields of downloaded data, before the downloaded data and pointers are stored in the local database.

BRIEF DESCRIPTION OF THE DRAWINGS

The purposes, objects and characteristics of the invention will become more apparent from the following description when taken in conjunction with the accompanying drawings in which:

FIG. 5 represents an example of a query page that could be used in the method according to the invention

DETAILED DESCRIPTION OF THE INVENTION

Figure 1:
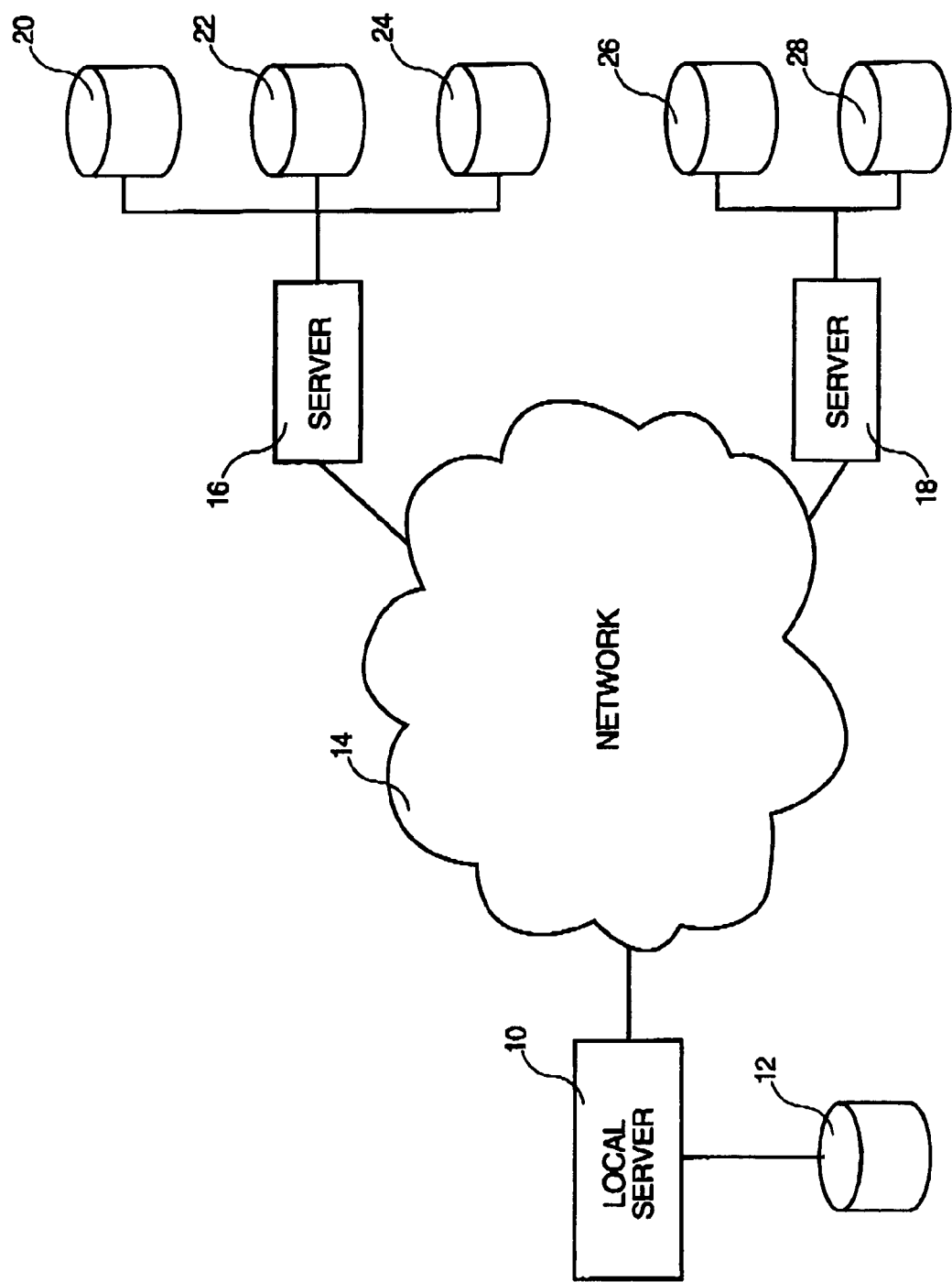
FIG. 1 schematically represents a data transmission network to which a local server and two external servers are connected, these external servers containing databases that the user associated with the local server wants to access according to the method of the invention

As illustrated in FIG. 1, the method according to the invention may be implemented in a local server 10 containing a local database 12, the local server being connected to a network 14 such as an IP type network and particularly the Internet. The local server 10 enables data search queries to be sent to the external servers 16 and 18 containing databases 20, 22, 24 and databases 26, 28 respectively. It should be noted that the local database 12 may be replaced by several databases without departing from the framework of the invention.

Figure 2:
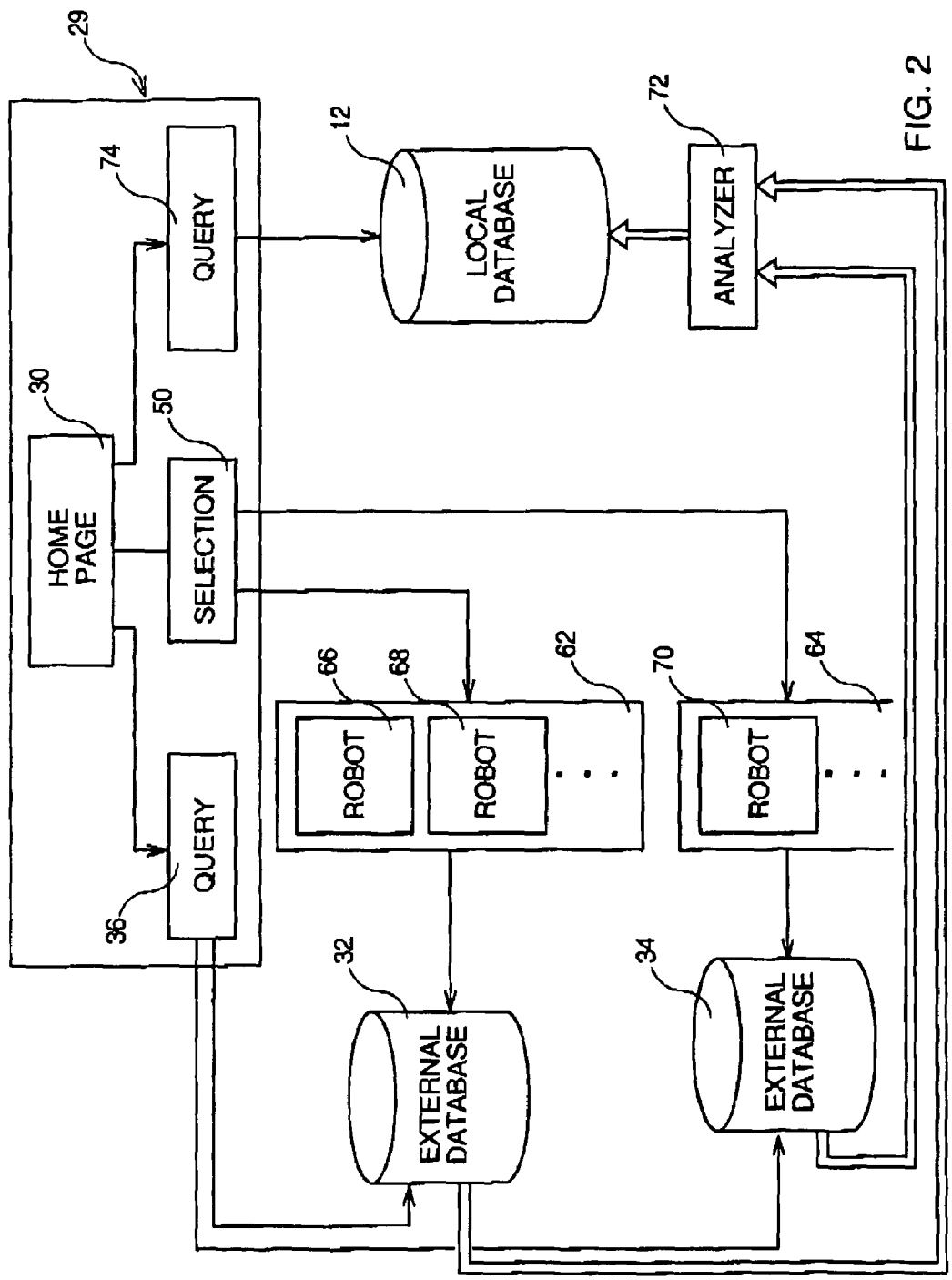
FIG. 2 is a block diagram representing the implementation system of the method according to the invention

The general block diagram of the invention is illustrated in FIG. 2. In the subsequent description, the method according to the invention will be applied to the search of information in patent databases. In the user interface 29 that is usually a workstation, a home page 30 is displayed on the local server's display unit when opening the browser. This home page displays one or more forms to access one or more external databases 32, 34 respectively, each form being designed to make up a query 36 to the selected database. It should be noted that a database may also be accessed from several forms.

The query 36 may be a simple list of patents or any other list such as the whole set of patents from a particular inventor or company. More advanced search criteria may be used such as searching with keywords or text by using Boolean operators on predetermined fields.

Figure 3:
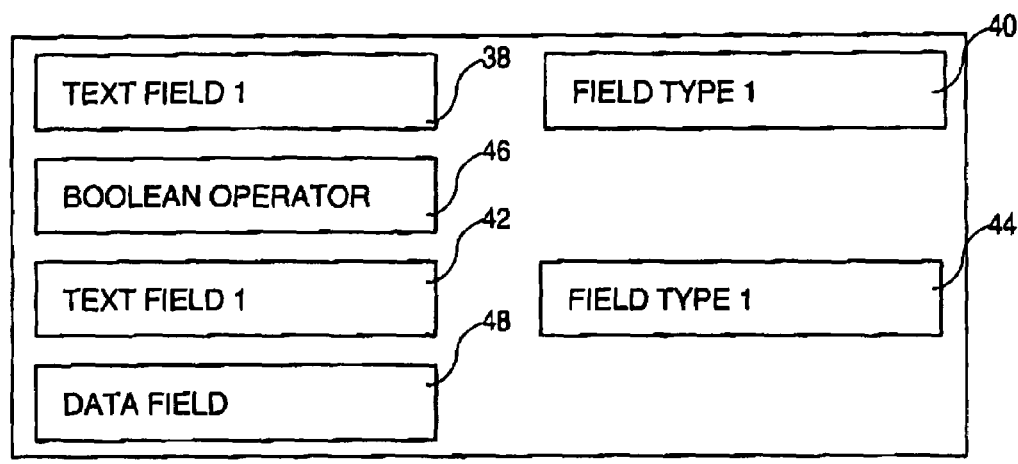
FIG. 3 represents an example of a query that could be used in the method according to the invention

FIG. 3 describes elements that may be used for text searching on external data servers. In fact, query options are adjusted according to the options available on each server but they retain certain common characteristics. Predefined templates simplify the user interface in this way. The proposed example contains a first pair of fields 38 and 40, namely a natural language text field and an associated field type in which search operations are to be performed. Boolean operators may be included in the text, depending on the server. Another pair 42 and 44 may also optionally be used and correlated with the first pair using a Boolean operator 46. To finish, a date field 48 may also be set to restrict the searches. The list of fields is not exhaustive. Depending on the servers, other features may also be used.

Once the fields have been defined in the query, typing the "Enter" command or clicking on a specific button of the user interface 29 transmits this query to the server associated with the given database. Since the server may operate in a language that is not the user's native language, a conversion to the desired language may be made in order to simplify the generation of the query, which is then translated by the generation system.

The external database 32 or 34 then returns the data resulting from the search that may also be translated into the user's language. In fact, the responses are in the form of hypertext links and pages that are interactively accessible using a browser from the local server.

Figure 4:
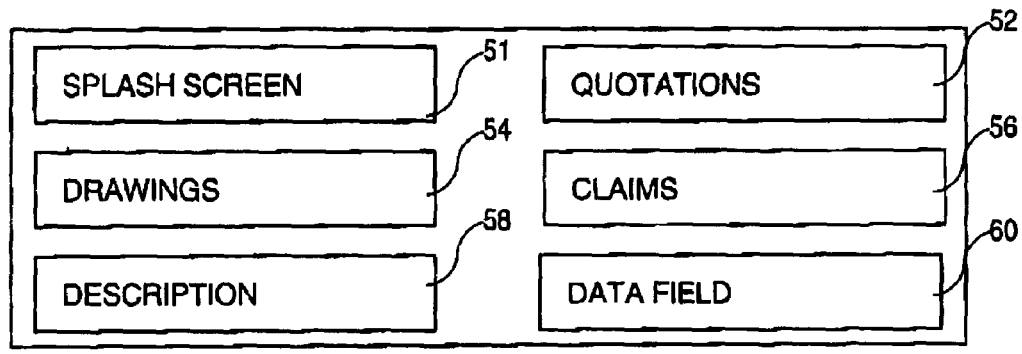
FIG. 4 represents an example of a selection page that could be used in the method according to the invention

At this stage, the user selects the type of data that he/she wishes to download from an HTML selection page 50 that is displayed, for example, in a field on the home page 30 of the user interface 29. This selection page illustrated in FIG. 4 generally contains the interesting elements to be downloaded such as the splash screen 51, quotations 52, drawings 54, claims 56, and the description 58. An additional field 60 helps define at what instant (time, date) the download is to be done.

The user then launches the download sequence by clicking on the corresponding button. The downloading begins with the generation of scripts that consist of a series of commands based on the search criteria of the query and which help in the creation of pointers identifying the data fields to be downloaded. These scripts are used for processes 62, 64 associated with databases 32 and 34 respectively to retrieve information from databases. Every process involves robots 66, 68 for process 62 or 70 for process 64. The number of these bots depends on the volume or quantity of data searched. Thus, it is possible that a number of bots between 10 and 100 may be operating in parallel querying the same database. If for example, the number of responses to the query is greater than 10,000 while the number of responses that can be provided by the server is restricted to 500, several bots will be required by selecting date of publication windows for each bot by adding logical ANDs. Therefore, logical ANDs operating on several fields simultaneously can be allowed for. In this way, each bot will remain within the permissible limit and the results will be complete, not partial as would have been the case with a traditional method. The results will be supplied to the user in a completely transparent manner.

The robots perform their tasks in the background from outside the server's browser. This is made possible in that every database has known display formats that enable the bots to easily retrieve the different pages of a patent. This requires some parsing of the pages in order to extract the information required to be able to access the next pages. For example, the USPTO database of US patents creates temporary directories for each query. In addition, the bots determine the number of pages of the patents, the location and the number of pages of drawings by reading underlying information from a patent page. In other words, the bots download the data fields indicated by the pointers created in the scripts as well as other data fields associated with data fields pointed to by predefined relations. According to an alternative, one may also download only those data fields that are not yet in the local database in order to minimize the volume of data to be downloaded.

After the download phase, the various downloaded pages are analyzed by a parsing unit to find or create fields such as the patent number, its publication date, the name of inventors etc. This step may be performed in parallel with the download step, once there is sufficient data available to process at least one patent. Then, the data provided by the analyzer 72 may be used for sending a new query. For example, non-US patents quoted for a US patent can be selected in the USPTO database and then searched in the ESPACENET database. Or, the analysis of different extensions of a patent may lead to selecting the best source for a given client.

Once the parsing process is complete for at least one patent, the local database 12 is fed by filling in the fields for each patent. It should be noted that the patent object in the local database includes a large number of fields. This includes the union (in the mathematical sense of the term) of the fields available separately for each accessible database. For example: US patents in the ESPACENET data bank do not contain US classification codes and these same patents do not contain the extensions or the ECLA code in the USPTO data bank.

Finally, the home page 30 in the user interface 29 also includes a query page 74 to query the local database 12 immediately or otherwise.

This page displays a grid of boxes to be filled in. Each box corresponds to a field for patents present in the database (e.g. international classification, US, applicant, etc.). There may also be an additional box to enter the download number, if one wishes to do so. There may also be another box to directly enter a query in SQL or the name of an SQL file with pre-programmed questions (SQL script). Logical operators may be applied between fields. Display and sorting parameters for the desired information may also be specified (for example—sort by company, sort by publication date, etc.). These parameters help display and/or group the patents together in one or several tree structures that may be defined and then navigated by using hyperlinks.

Figure 6:
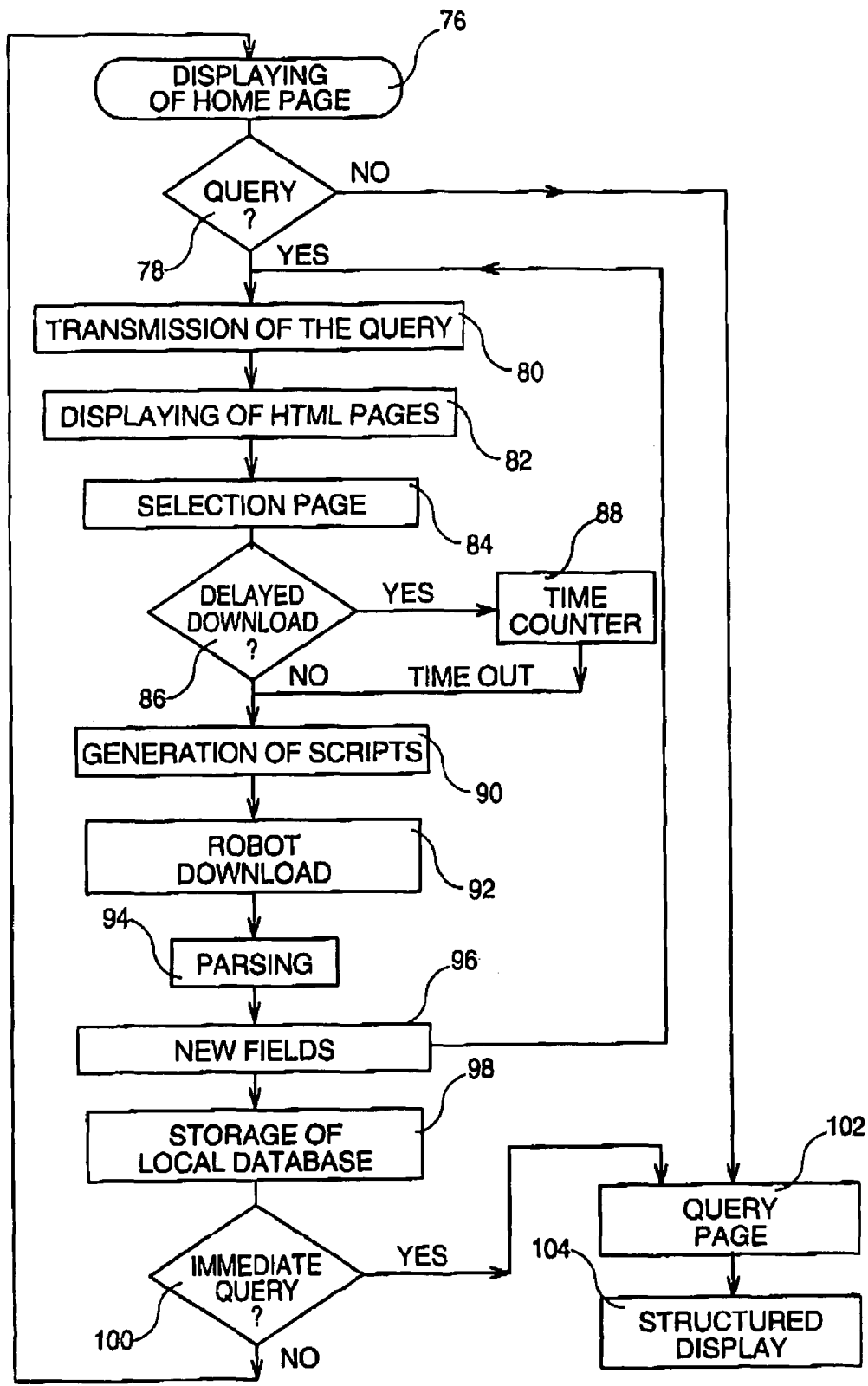
FIG. 6 is a flowchart representing the various steps implemented in the method according to the invention.

A query page usually includes the exhaustive list of fields illustrated in FIG. 6: the patent number, the title, the inventor(s), the applicant, the issue date, the publication date, the abstract, the claims, the description, the US classification, the cited patents, the international classification, the ECLA classification, the country of priority, the priority number, the family, the filing date as well as the application number, the patent attorney and finally the name of the first examiner. This list is just an example and new elements may be added to it.

In order to understand well the method according to the invention, the different steps of said method are represented in FIG. 6. After the home page (76) is displayed in the user interface, the user must determine if he/she wishes to query the local database (78). If he/she wishes to make a query, the latter is sent through the transmission network to the selected external server (80). The queryed HTML pages (82) are then displayed.

Then, the user selects the type of information he/she wishes to download by filling in the selection page (84). As seen previously, an additional field may be provided on the selection page to define whether or not the download is delayed (86). This corresponds to a batch mode that prevents saturation of the network and the server depending on the download volume. Another advantage of this delayed download is the grouping together of all downloads from this particular server, which further masks the objective of the query. If the download has to be delayed, a time counter is started (88), and the process continues only after a predefined time period has elapsed.

After the decision to download has been taken, the next step is the generation of scripts (90) followed by the actual download by the robots (92). Then the method starts the parsing step (94) that helps define new data fields (96). It should be noted that these data fields may, in turn, be used as search fields for a new query within the same or another database.

Then, the downloaded data fields and the pointers to new data fields set during the parsing step are stored in the local database (98). At this stage, it is possible to query immediately the local database (100). If this is not the case, the process returns to the display of the home page (76). If the user wishes to make an immediate query, as is usually the case, the query page is filled in (102) and a structured display of data fields selected by the query page appears on the user interface (104).

When the data has been stored in the local database (98), it is converted into an SQL sequence. When a query is made, the raw data from the local database is converted into an HTML page comprising an index and the query grid of the query page. This index is a string of hyperlinks (number and title of patents found, etc., or display parameters) to a process that displays the contents of a patent. The SQL script of the query is also displayed so that it can be changed or archived in a file. Every query is assigned a number; this helps combine several queries. This number and the corresponding SQL scripts are destroyed or saved at the end of the session depending on the user's choice. The query process of the local database may be used again to refine the query. It is possible to export the result of the query to a directory so that it may subsequently be written onto a CD-ROM, or output to an Intranet site for printing, for example.

The preceding description shows that the method of the invention (and the system enabling its implementation) helps collect data automatically, efficiently and quickly by using a plurality of bots that can function simultaneously on the same database, on several databases in the same server or on databases in different servers. In addition, the method of the invention is secure in that the most specific search is never made on external servers, but on the local server even though the entire data is downloaded. It is therefore possible to make a general query using only one word or a classification code and download all of the patents that meet this criterion. The downloaded patents are then analyzed with a parser and the local database may then be queried to obtain specific data with complete confidentiality.

Changes may be made to the method that has just been described without departing from the framework of the invention. Thus, an executed query may be regularly updated later, every month for example, in order to automatically take into account the updates made on the external servers. To this end, all that is needed is to define the automatic update function in the date field of the query (see FIG. 3) along with the update frequency, optionally. Thus the local database will be an image of the external databases with a very slight delay. A message is then generated for the user to warn him at the time of every update.

What is claimed is:

1. A method for searching data stored in at least one database accessible from at least one external server of a data transmission network, comprising addressing a query for every database from a local server associated with at least one local database, said query including fields containing general criteria relating to type of information searched for, content of the information, and/or dates associated with the information, with an ability to link said fields by means of Boolean operators, and downloading the data that meets general criteria of the external server to the local server, wherein said method further comprises, after data that meets said general criteria has been downloaded from said external server to said local server, a step of parsing the downloaded data according to specific criteria different from said general criteria, enabling creation of pointers to specific data fields of said downloaded data, before said downloaded data and said pointers are stored in said local database.

2. A method for searching data stored in at least one database accessible from at least one external server of a data transmission network, comprising addressing a query for every database from a local server associated with at least one local database, said query including fields containing general criteria relating to type or information searched for, content of the information, and/or dates associated with the information, with an ability of linking said fields by means of Boolean operators, and then downloading the data that meets said general criteria of said external server to said local server;

wherein said download step includes the following steps:

generation of scripts by said local server comprising a series of commands based on said general criteria and enabling creation of pointers to identify the data fields to be downloaded, and activating bots enabling the download of data fields indicated by said pointers as well as other data fields associated by predefined relationships with said indicated data fields.

3. The method of claim 2, further comprising after the download step, a step of parsing the downloaded data according to specific criteria different from said general criteria, enabling creation of pointers to specific data fields of said downloaded data, before said downloaded data and pointers are stored in said local database.

4. The method of claim 3, wherein said specific data fields created by said parsing step are used to send a new query for the same or another database.

5. The method of claim 1, further comprising a selection step in a selection page in a user interface, enabling the user to select some of said data fields that meet said general criteria after HTML data pages queried in the query have been displayed.

6. The method of claim 2, further comprising a selection step in a selection page in a user interface, enabling the user to select some of said data fields that meet said general criteria after HTML data pages queried in the query have been displayed.

7. The method of claim 5, wherein said selection page includes an additional field containing a time and/or date when a delayed download is to start.

8. The method of claim 2, wherein a number of bots activated for a download step depends on a volume of data searched so that the quantity of data downloaded by said bots is not limited by parameters associated with the database in which said data is contained.

9. The method of claim 8, wherein a task of each of said bots is to parse data pages to be downloaded in order to extract information required for the retrieval of subsidiary or underlying data in said data pages.

10. The method of claim 2, further comprising a query step by means of a query page in a user interface, enabling a user to access data fields stored in said local database.

11. The method of claim 10, wherein said query page includes identification of data fields that may be selected by the user so that they are displayed in the user interface, with the ability of linking said fields by means of Boolean operators.

12. The method of claim 11, wherein the information selected from said query page is automatically converted into SQL before it is transferred to said local database.

13. The method of claim 1, wherein said query includes a date field so that it can be updated regularly in order to automatically take into account updates in said external databases.

14. The method of claim 2, wherein said query includes a date field so that it can be updated regularly in order to automatically take into account updates in said external databases.

15. The method of claim 1, wherein said external databases are patent databases.

16. The method of claim 2, wherein said external databases are patent databases.

17. A system for searching data in external databases including means adapted for implementing the steps of the method according to claim 1.

18. A system for searching data in external databases including means adapted for implementing the steps of the method according to claim 2.

\* \* \* \* \*